Feb. 3, 1970  A. N. GOOD ET AL.  3,493,036
GEAR PUMP AND HEATING AND COOLING MEANS THEREFOR
Filed June 28, 1968
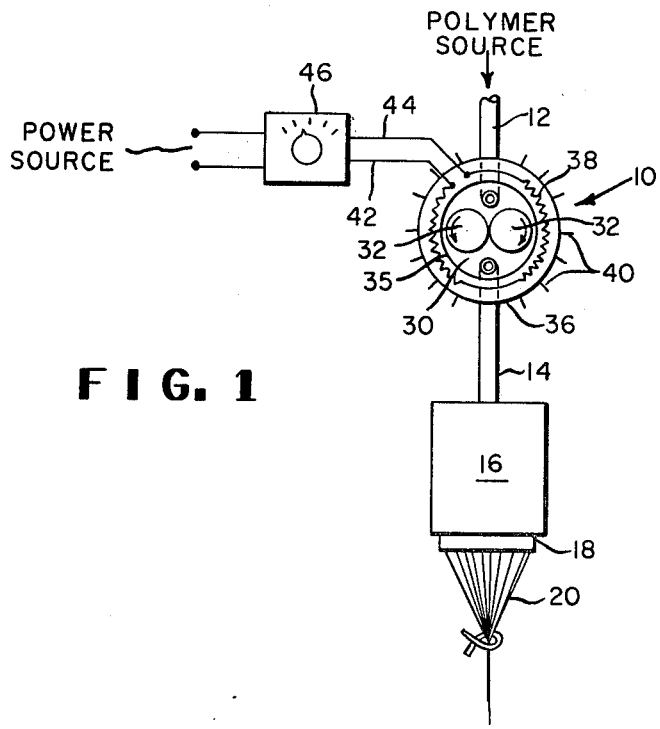
FIG. 1
FIG. 2
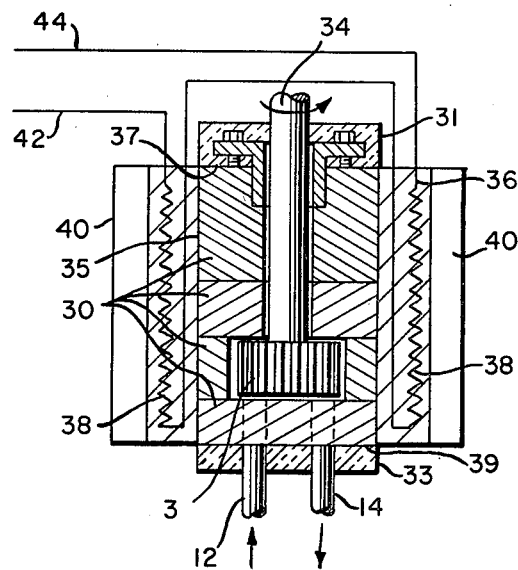
INVENTORS
ALFRED NELSON GOOD
JOSEPH DODSWORTH WEED
BY *Howard P. West Jr.*
ATTORNEY

United States Patent Office 3,493,036
Patented Feb. 3, 1970

3,493,036
GEAR PUMP AND HEATING AND COOLING MEANS THEREFOR
Alfred Nelson Good, Hixson, Tenn., and Joseph Dodsworth Weed, Hockessin, Del., assignors to E. I. du Pont de Nemours and Company, Wilmington, Del., a corporation of Delaware
Filed June 28, 1968, Ser. No. 740,999
Int. Cl. F25b 29/00
U.S. Cl. 165—30                6 Claims

ABSTRACT OF THE DISCLOSURE

A pumping apparatus for molten high viscosity polymers including a gear pump for metering polymer from a source to an extrusion device wherein the gear pump is jacketed with a device for supplying a regulated amount of heat to the pump while simultaneously removing excess heat from the pump to regulate the temperature rise normally encountered in pumping molten, high viscosity polymer.

BACKGROUND OF THE INVENTION

This invention concerns a gear pump for molten, high viscosity polymers and more specifically a gear pump equipped with heating and cooling means for controlling the temperature rises normally encountered in pumping molten, high viscosity polymers.

In the manufacture of synthetic fibers by the melt-spinning of high molecular weight polymers, gear pumps are commonly employed to meter the polymer flow and boost the pressure in a transfer line connecting a screw-melter or polymerizer vessel to the spinning position. The molten polymers normally experience an increase in temperature as they pass through such pumps due to the conversion of viscous drag and other mechanical work into heat. With highly viscous molten polymers, for example poly(hexamethylene adipamide) having a molecular weight above 20,000, such as a temperature increase can be quite undesirable due to the additional thermal degradation encountered in the polymer. Such temperature increases can be controlled or avoided by the use of a screw extruder in place of a gear pump, wherein the extruder is equipped with cooling means in the extruder barrel or screw, or both. Such devices normally are much more expensive and bulky and suffer a loss in polymer metering capabilities vs. the gear pumps which they replace. Contrary to expectations, it has been found that gear pumps can be provided with means for removal of excess heat generated during the pumping of high-viscosity molten polymers and that this can be accomplished without an undue increase in work load.

SUMMARY OF THE INVENTION

The invention is in an apparatus for pumping molten, high-viscosity, thermoplastic polymers to an extrusion means including a gear pump having a housing with top, bottom and outer peripheral surfaces, means for feeding under pressure a molten high-viscosity polymer to the pump, and heated conduit means connecting the pump to said extrusion means. The improvement comprises independent means for supplying a controlled amount of heat to the pump and means for simultaneously removing heat from the pump.

In the preferred embodiment of the invention the improvement comprises a convection cooler attached to or integral with the outer periphery of the pump housing. The cooler has embedded therein electrical heating elements for supplying a controlled amount of heat to the pump.

BRIEF DESCRIPTION OF THE DRAWINGS

FIGURE 1 is a schematic illustration of the apparatus of this invention in an installation for melt spinning filaments from synthetic, fiber forming polymers.

FIG. 2 is a cross-sectioned elevation of the apparatus of this invention.

DETAILED DESCRIPTION OF THE ILLUSTRATED EMBODIMENTS

Referring to FIGS. 1 and 2, a driven metering gear pump 10, forces molten polymer supplied through conduit 12, at a desired metering rate through conduit 14 to pack assembly 16. Filaments 20 are formed by having the molten polymer forced through spinneret 18 attached to the lower portion of pack assembly 16. Conduits 12, 14 are preferably heated and insulated. Gear pump 10 includes a pump housing 30 comprising a plurality of plates which enclose gears 32 driven by drive shaft 34. Attached to and enclosing the outer peripheral surface 35 of pump housing 30 and serving as a jacket therefor is a convection cooler 36 which may be formed of a metal plate or other heat conductive material having embedded therein electrical heating elements 38 connected to leads 42, 44. The convection cooler 36 may include a plurality of spaced vertically or horizontally disposed surface extensions or fins 40 on its outer surface and preferably the inner surface of cooler 36 is in contact with the outer peripheral surface of housing 30. Heating elements 38 are energized and their output regulated by voltage regulator 46 connected between a power source and leads 42, 44. Preferably, the top and bottom surfaces 37, 39 of pump housing 30 are provided with insulating means such as covers 31, 32 respectively while the outer finned surface of radiant cooler 36 is exposed to the surrounding atmosphere.

The apparatus of this invention permits effective temperature control in the handling of molten, high-molecular weight, thermoplastic polymers having viscosities as high or higher than 10,000 poises by proper design of the gear teeth and the heating and cooling means. This temperature control can be accomplished with little, if any, loss in pump efficiency and metering capability.

Heat generation by the action of pump 10 can be minimized by reducing the number and pitch of the gear teeth. Because of this, the polymer can be cooled more effectively in a pump having a 6 pitch 11 tooth gear than a 12 pitch 22 tooth gear, other factors being equal. However, the apparatus is effective over a broad range of gear sizes and proportions as shown in Table I.

| Nominal delivery, cu. in./rev. | Gears | Diam. Pitch | Pitch Diam. | Gear Thickness | No. Teeth |
|---|---|---|---|---|---|
| 1.2 | 2 | 12 | 1.83 | 1.27 | 22 |
| 2.4 | 2 | 6 | 1.83 | 1.27 | 11 |
| 7 | 2 | 5 | 4.00 | 1.40 | 20 |
| 12 | 2 | 3 | 4.00 | 1.40 | 12 |
| 28 | 3 | 5 | 4.00 | 2.80 | 20 |
| 50 | 3 | 3 | 4.00 | 2.80 | 12 |

With proper design of gears 32 and radiant cooler 36 it is possibile to achieve a net overall temperature reduction for the polymer passing through the pump 10.

The optimum operating range for any given pump and radiant cooler design can be readily determined by observing the effect of cooling on pump power input and polymer flow rate.

In use the amount of heat supplied to the radiant cooler 36 should be sufficient to prevent the temperature of the polymer in contact with the inner surface of the pump housing from falling below its melting point. Beyond this, the amount of heat supplied will be dependent on the degree of cooling required to attain the desired perature control and pump operation. Operating conditions may be adjusted to limit the polymer temperature to an acceptable degree, normally for example less than about 10° C., or to maintain a constant input and output temperature, or to reduce the polymer temperature below that of the polymer feed temperature. Care must be taken to assure that cooling of the pump is not permitted to interfere with uniform temperature regulation of the heated feed and discharge transfer lines connected to the pump which can result in non-uniformities or even blockage in the polymer flow in the lines. This can be avoided by proper insulation means for example by means of insulation cover 33 or a metal plate between the pump and the block to which it and the conduits are connected.

Having the heat control of the gear pump independent of the heating for the polymer transfer lines permits much greater versatility in the capability of this system to handle polymers of different melt viscosities than that provided by gear pump-transfer line assemblies of the prior art.

In test runs the apparatus of this invention has been shown to reduce internal polymer leakage in gear pumps because of the increased polymer viscosity from cooling of the clearance spaces between the housing 30 and the gears 32.

Effective temperature control using the apparatus of this invention has been demonstrated with polymer melts having a viscosity as high as 9000 poises. Also effectiveness with lower viscosity polymers has been demonstrated at flow rates as high as 4000 lbs./hr. at differential pressures of about 3000 to 4000 lbs./in.² and also at flow rates of 60 lbs./hr. at differential pressures as high as about 10,000 lbs./in.². Polymer temperature control in gear pumps under these conditions was heretofore considered impractical without an undesirable increase in work load or loss of uniformity in polymer flow characteristics.

Other heating and cooling means than already illustrated can be employed. For example, the cooler or pump housing may contain separate channels for flowing heating and cooling fluids therethrough to obtain the desired temperature control. The preferred cooling means, however, is the use of fins or other surface extensions cooled by forced or free ambient air, due to their unexpected effectiveness, simplicity and low cost.

1. In an apparatus for pumping molten thermoplastic polymer to an extrusion means including a driven gear pump having a housing, said housing having top, bottom, and outer peripheral surfaces, means for supplying molten polymer to the pump, and conduit means connecting said pump to an extrusion means the improvement comprising:
 (a) a cooler connected to an enclosing said outer peripheral surface; and
 (b) means coupled with said cooler for supplying a regulated amount of heat to said pump.

2. The apparatus of claim 1 wherein said means for supplying a regulated amount of heat comprises: a source of electrical power; and electrical heating element embedded in said cooler, and a voltage regulator connected between said source and said heating element.

3. The apparatus of claim 1, there being insulation means attached to said top surface.

4. The apparatus of claim 1, said cooler being a convection cooler and having a plurality of spaced fins disposed on its outer surface.

5. The apparatus of claim 1, there being insulation means attached to said top and bottom surfaces.

6. In an apparatus for pumping molten thermoplastic polymer to an extrusion means including a driven gear pump having a housing, said housing having top, bottom, and outer peripheral surfaces, means for supplying molten polymer to the pump and conduit means connecting said pump to an extrusion means, the improvement comprising:
 (a) a heat conductive jacket attached to and enclosing said outer peripheral surface, said jacket having an outer surface with a plurality of surface extensions vertically disposed thereon, there being insulation covers attached to the top and bottom surfaces of said housing;
 (b) at least one electrical heating element embedded in said jacket;
 (c) a source of electrical power; and
 (d) means connected between said heating element and said source for regulating the amount of heat supplied by said heating element.

References Cited

UNITED STATES PATENTS

| 2,541,201 | 2/1951 | Buecken et al. | |
| 2,574,907 | 11/1951 | Bucken. | |
| 2,774,107 | 12/1956 | Davis | 165—185 |

ROBERT A. O'LEARY, Primary Examiner

CHARLES SUKALO, Assistant Examiner

U.S. Cl. X.R.

165—48, 64